United States Patent
Bojsen

(10) Patent No.: US 9,681,607 B2
(45) Date of Patent: Jun. 20, 2017

(54) TWIN AXIAL-FLOW CROP PROCESSOR IN A COMBINE HARVESTER

(71) Applicant: AGCO International GmbH, Hesston, KS (US)

(72) Inventor: Thomas Mygind Bojsen, Randers (DK)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 15/046,651

(22) Filed: Feb. 18, 2016

(65) Prior Publication Data

US 2016/0242360 A1 Aug. 25, 2016

(30) Foreign Application Priority Data

Feb. 25, 2015 (GB) .................................. 1503118.0

(51) Int. Cl.
*A01F 7/06* (2006.01)
*A01F 12/18* (2006.01)

(52) U.S. Cl.
CPC .............. *A01F 12/18* (2013.01); *A01F 7/06* (2013.01)

(58) Field of Classification Search
CPC ....... A01D 41/1271; A01F 7/06; A01F 7/067; A01F 12/442; A01F 12/26; A01F 12/10; A01F 12/18
USPC .......... 56/75, 80, 83, 84; 460/62, 66, 68–70, 460/79, 84
See application file for complete search history.

(56) References Cited

U.S. PATENT DOCUMENTS

| | | | |
|---|---|---|---|
| 5,112,279 A | 5/1992 | Jensen et al. | |
| 5,334,093 A * | 8/1994 | Jensen | A01F 12/442 460/107 |
| 5,344,367 A * | 9/1994 | Gerber | A01F 12/10 460/68 |
| 6,500,063 B1 * | 12/2002 | Gryspeerdt | A01D 41/1271 460/66 |
| 6,802,771 B2 * | 10/2004 | Schwersmann | A01F 12/442 460/109 |
| 8,221,202 B2 * | 7/2012 | Pope | A01F 7/06 460/68 |
| 8,231,446 B2 * | 7/2012 | Pope | A01F 7/067 460/62 |
| 8,251,787 B2 * | 8/2012 | Barrelmeyer | A01F 7/06 460/69 |

FOREIGN PATENT DOCUMENTS

| | | |
|---|---|---|
| CN | 201888107 U | 7/2011 |
| GB | 1399601 A | 7/1975 |
| GB | 1403526 A | 8/1975 |

OTHER PUBLICATIONS

Intellectual Property Office, International Search Report for related UK Application No. GB1503118.0, dated Aug. 10, 2015.

* cited by examiner

*Primary Examiner* — Robert Pezzuto

(57) ABSTRACT

A combine harvester including a frame and a twin rotor crop processor mounted to the frame. The processor comprises a pair of axial-flow crop processing rotors arranged side-by-side and each being mounted for rotation inside a generally cylindrical rotor housing. Each rotor housing includes a curved cover plate. Each cover plate has a structure that includes a flange along a longitudinal edge for securing the plate to a central frame member between the rotor housings. Both flanges intersect a hypothetical vertical plane aligned with the frame member.

7 Claims, 4 Drawing Sheets

TWIN AXIAL-FLOW CROP PROCESSOR IN A COMBINE HARVESTER

BACKGROUND OF THE INVENTION

Field of Invention

The present invention relates to a twin rotor housing assembly for a combine harvester comprising a pair of curved cover plates which each form part of a generally cylindrical rotor housing for a respective rotor, and each comprising, along a longitudinal edge, means to secure the cover plates to a central fixing structure.

Description of Related Art

Twin axial-flow or rotary combine harvesters usually have a pair of crop processing rotors each arranged side by side and each having a rotation axis which is substantially parallel to the longitudinal axis of the harvester. In some machines the rotors perform both the threshing and separating action upon the cut crop flow delivered thereto. In other machines, such as 'hybrid' machines, a tangential-flow threshing cylinder is employed upstream of the rotors, wherein the rotors themselves serve a subsequent separating function.

Each crop processing rotor is mounted in a respective rotor housing which is generally cylindrical and which includes a grate or concave in the lower section to allow separated grain to fall onto an underlying collection pan. Enclosing curved cover plates are provided in an upper section of the housing.

Crop material is fed into a front inlet section where the crop material is engaged by flighting elements on the rotor. The crop material is conveyed as a ribbon or mat in a generally rearward axial and helical path in the space between the rotor and the rotor housing. Axial conveyance of the crop material is driven by the interaction between guide vanes provided on the inside surface of the upper cover plates and threshing and separating elements provided on the rotor. Threshing of the crop material and the subsequent separation of the grain therefrom is mostly carried out in the lower portions of the helical path by the interaction between the threshing and separating elements respectively and the concave, the space between which is adjustable. Separated crop material passes by gravity through the grate whereas the longer bulkier straw residue is conveyed via an outlet or discharge section at the rear of the housing.

The pair of rotor housings together provide a housing assembly which is secured with respect to the frame or chassis of the combine harvester. The upper cover plates and the lower concave sections are separately mounted components.

The cover plates are substantially half cylindrical in shape and are mounted along respective outer and inner longitudinal edges to fixing points provided by the machine frame. Flanges are often provided along the edges of the cover plates so as to provide means of fastening to the frame by bolts.

There is a continuing demand for combine harvesters of larger and larger capacity. However, constraints on the overall machine size dictated by national highway laws prevent manufacturers from simply upping the dimensions of the various crop processing systems. For example, the diameter of the rotor housings of twin-axial processors are constrained by the overall machine width and the spacing between the respective rotor housings. In turn, this inhibits any significant increase in the crop-processing capacity of twin-axial processors.

OVERVIEW OF THE INVENTION

In accordance with the invention there is provided combine harvester comprising a frame and a twin rotor crop processor mounted to the frame, the processor comprising a pair of axial-flow crop processing rotors arranged side-by-side and each being mounted for rotation inside a generally cylindrical respective rotor housing, wherein each rotor housing comprises a curved cover plate, wherein each cover plate has a structure that includes a flange disposed along a longitudinal edge for securing the plate to a central frame member disposed between the rotor housings, and wherein both flanges intersect a hypothetical vertical plane aligned with the frame member.

By providing a transverse overlap between in the two cover plates in a central region, the space occupied by any frame member which serves as a fastening location for the cover plates is minimized. As a result, the transverse spacing between the respective rotor housings can be reduced thus increasing the design freedom to increase the rotor diameter and thus combine capacity.

Each cover plate may comprise along a respective longitudinal edge flange portions for securing the plates to a central frame member, the flange portions of each cover plate having a mutually complimentary profile to permit removal of either cover plate without removing the other.

In a preferred embodiment the flange portions of one of said cover plates interleave with the flange portions of the other one of said cover plates. By transversely interleaving flange portions or tabs either cover plate can be removed without disturbing the other thus facilitating more convenient maintenance routines where removal of the cover plates is required.

The flange portions of each cover plate preferably define a complimentary repeating profile in the longitudinal direction or other words a repeating pattern so that regularly spaced fastening points are provided along the length of the cover plate.

It is recognised that the central frame member can be reduced in width to accommodate flange portions from both cover plates having an overlying relationship. However, such an arrangement is less preferred because unfastening of both cover plates would be required to remove only one. The transverse interleaved pattern allows removal of one cover plate without disturbing the other.

In a preferred arrangement the edges of the flange portions of one cover plate abut the edges of the other cover plate thereby exploiting to complementary profiles to 'interlock' in a horizontal plane and reduce play in the horizontal direction even without the fastening means in place. However it should be understood that the edges of the flange portions of the respective cover plates need not necessarily abut with one another.

The central frame member may comprise a single longitudinal row of bolt holes or fastening points, wherein the flange portions of both cover plates are secured to the frame member by bolts inserted into the bolt holes. Advantageously, a single row of bolts, or alternative fastening means, occupy less space between the rotors thus increasing the design freedom in the width-wise envelope. Each cover plate may be bolted to alternate individual or pairs of bolt holes along said row of bolt holes.

Each cover plate may be one of a plurality of cover plate sections in a multi-section assembly associated with each rotor. For example, each rotor may have associated therewith a cover plate assembly having a front and rear cover plate sections. It should be understood that the invention can apply to a pair of cover plate sections, each being associated with a respective processing rotor.

BRIEF DESCRIPTION OF THE DRAWINGS

Further advantages of the invention will become apparent from reading the following description of specific embodiments with reference to the appended drawings in which:—

DETAILED DESCRIPTION OF A SPECIFIC EMBODIMENT

An example embodiment of the invention will now be described. Relative terms such as 'front', 'rear', 'left', 'right', 'vertical', 'horizontal', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the rotation axis of the rotor.

Figure 1:
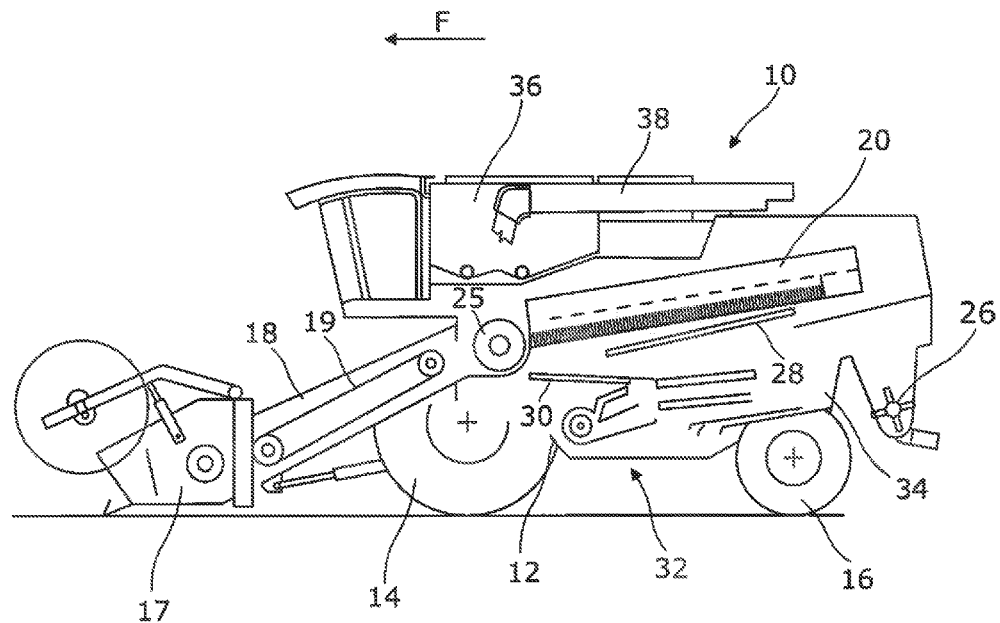
FIG. 1 is schematic side view of a combine harvester revealing the internal workings thereof.

With reference to FIG. 1 a combine harvester 10 includes a frame 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvester other harvesting crops.

The cut crop stream is conveyed rearwardly from the feederhouse 18 to a processor designated generally at 20. The processor 20 includes a pair of axial flow threshing and separating rotors which are each housed side-by-side inside a respective rotor housing and are fed at their front end by a feed beater 25. The rotors serve to thresh the crop stream in a front 'threshing' region, separate the grain therefrom in a rear 'separating' region, and eject the straw residue through the rear of the machine either directly onto the ground in a windrow or via a straw chopper 26.

As will be explained in more detail below, each rotor housing comprises a combination of concave sections and separating grate sections in the underside of the housing which allow the separated material to fall by gravity onto return pan 28 located below. Return pan 28 comprises a tray-like structure and serves to convey the collected grain forwardly to a front edge from where the grain falls on to a grain pan 30. The collected mix of grain kernels, chaff, unthreshed tailings and shorter straw is conveyed rearwardly by grain pan 30 into a cleaning unit designated generally at 32.

Cleaning unit 32 is of a known construction and includes oscillating sieves which sort the crop material, ultimately ejecting residue through the rear of the machine 34 whilst the clean grain is conveyed by a (not shown) elevator to an on-board storage tank 36. For completeness, the combine 10 includes an unloading system which includes an unloading auger 38 shown in part in FIG. 1.

Figure 2:
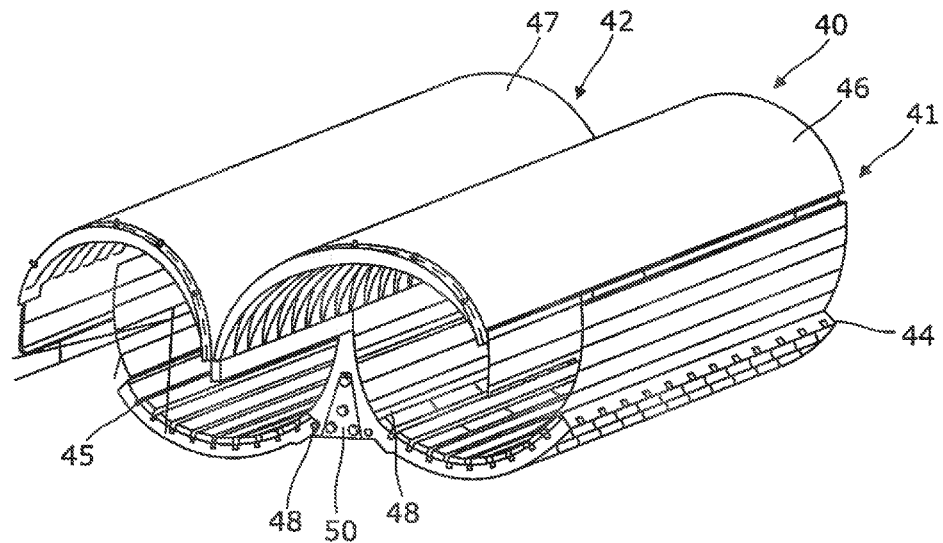
FIG. 2 is a front perspective view of a twin rotor housing assembly in accordance with an embodiment of the invention.

The invention relates to the construction of the rotor housings, and in particular, the cover sections thereof. Turning back to the processor, it should be understood that only the left-hand side of processor 20 can be seen in FIG. 1. The processor 20 comprises a twin rotor housing assembly 40 as seen in FIG. 2. The housing assembly 40 comprises a left-hand rotor housing 41 and right-hand rotor housing 42. It should be understood that the threshing and separating rotors are omitted from FIG. 2 for ease of explanation.

Each rotor housing 41,42 is identical in construction other than being a mirror image or 'handed' version of the other.

As mentioned above each rotor housing 41,42 comprises a lower grate section 44,45 and a curved, non-perforated, cover plate section 46,47. Each lower grate section 44,45 includes one or more arcuate adjustable concave sections in the front threshing region, and one or more arcuate separator grates in the rear separating region. At least the concave sections are pivotable about a longitudinal axis 48 proximate to the centre frame rail 50 so as to allow adjustment of the spacing between the concave and the rotor threshing elements as is known. It should be understood that the arcuate concave and grate sections may be formed of one or more sections as is known in the art and may have an associated actuator (not shown) for adjustment around axis 48.

Central frame member of rail 50 forms part of the frame 12 and is fixed in relation to the chassis 12. The frame member 50 has an elongate structure and is located between the rotor housings 41,42. The frame member 50 provides a mounting location for both the grates 44,45 as described above and for the top cover plates 46,47. The present invention concerns the manner in which the cover plates 46,47 are attached to the centre fixing rail 50.

Figure 3:
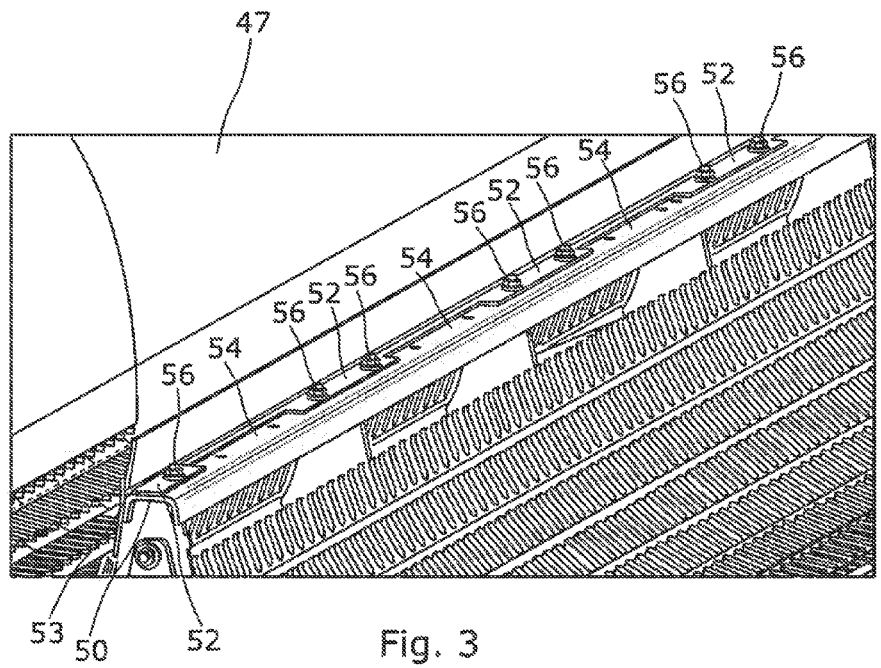
FIG. 3 is close up perspective view of the housing assembly of FIG. 2 shown with the left-hand cover plate removed to reveal the central fixing rail.

With reference to FIG. 3 right-hand cover plate 47 comprises a plurality of flange portions 53 disposed along the inner longitudinal edge 53, the flange portions 52 serving as a means to fasten the cover plate 47 to the central frame member 50. The flange portions are angled with respect to the cover plate 47 along a bend axis co-axial with edge 53. Each flange portion 52 in the example shown is substantially rectangular in shape, each portion 52 being spaced from an adjacent flange portion in the longitudinal direction leaving gaps 54 there between.

The flanges may be integral with the structure of the arcuate part of cover plate by simply providing a bend line between such. Alternatively, the flanges may be welded or secured by other suitable means to the cover plates.

Each flange portion or tab 52 includes a pair of bolt holes aligned longitudinally, the bolt holes aligning with corresponding holes formed in the underlying frame member 50 to facilitate securing of the top cover 47 to the fixing rail 50 by bolts 56 or other suitable fastening means. The flange portions 52 disposed along the inner longitudinal edge 53 define a flange profile which is mutually complementary to a flange profile defined by flange portions 62 provided on the left-hand cover plate 46.

Figure 4:
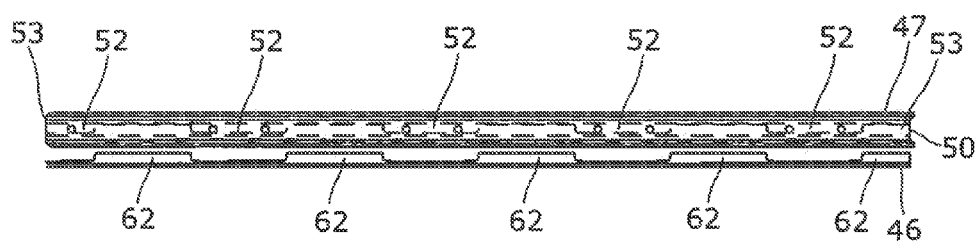
FIG. 4 is plan view of the central fixing rail shown in FIG. 3 shown with the flange portions of the left-hand cover plate space sideways therefrom to reveal the underlying rail.
Figure 5:
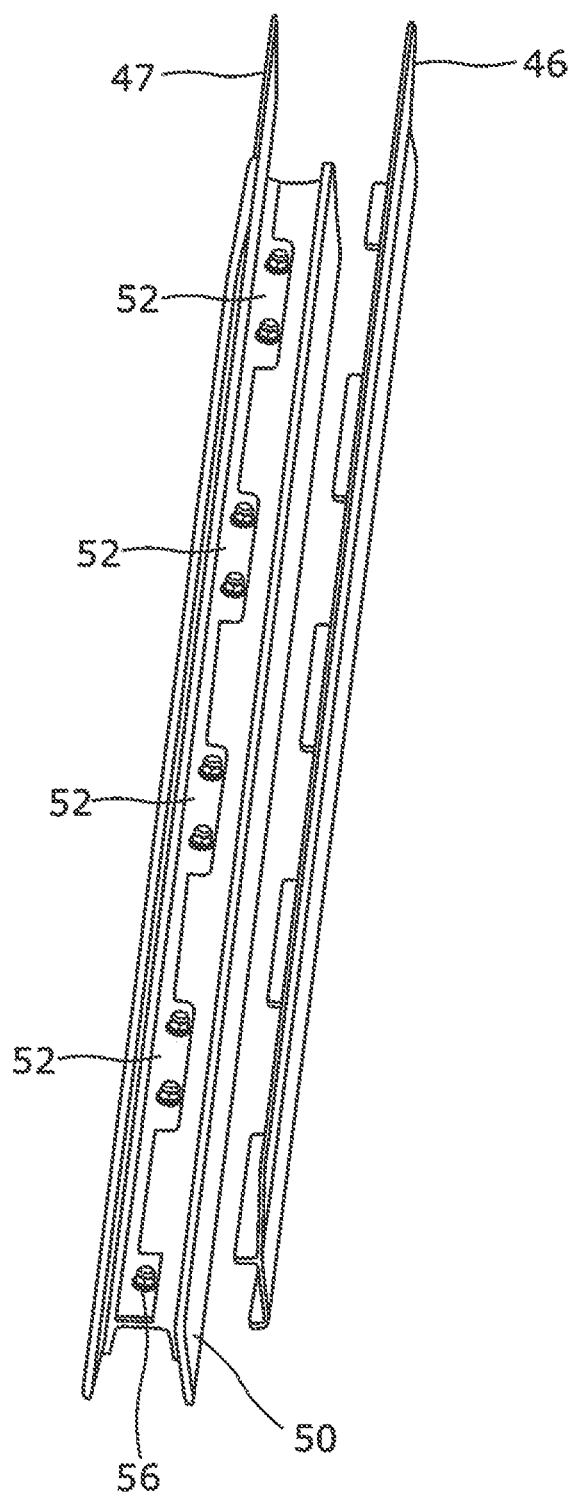
FIG. 5 is a top front perspective view of the central fixing rail and flange portions of the respective cover plates showing those flange portions of the left-hand cover plate spaced sideways therefrom; and, FIGS. 6, 7 and 8 show alternative transversely interleaved complimentary flange profiles in accordance with different embodiments of the invention.

As can been seen from FIGS. 4 and 5, complementary flange portion 62 fit between the flange portions 52 of the right-hand cover plate 47. In other words the flange portions 52 of the right-hand cover plate 47 interleave with the flange portions 62 of the left-hand cover plate 46 at least in a horizontal plane.

In a similar manner to the right-hand flange portions 52, left-hand flange portions 62 include a pair of holes to accept fixing bolts (not shown).

During assembly or disassembly the interleaved flange profiles serves to restrict movement of one cover plate with respect to the other even when the bolts are removed.

However, a more significant advantage is that one or other of the cover plates 46,47 can be unbolted and removed without affecting the other thus simplifying maintenance when access to the rotors from above is required.

It should be understood that for each rotor housing 41, 42 the cover plates 46,47 may be formed as one unit or in sections. For example, a front cover plate portion corresponding with the front threshing zone may be provided separately from a rear cover plate portion corresponding to the rear separating zone. In such case, the interleaving flange profile can be provided on both front and rear cover plate portions, or, alternatively, on only one section.

Although shown as a regular repeating rectangular flange profile in FIGS. 3, 4 and 5, it should be understood that many alternative flange profiles can be adopted without deviating from the scope of the invention.

Figure 6:
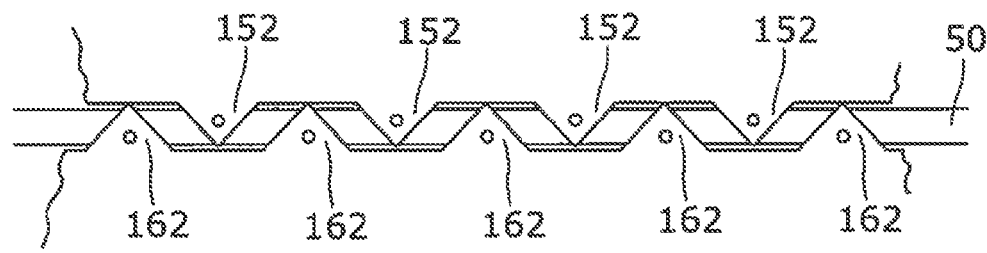

FIG. 6 illustrates a first such alternative construction comprising triangular flange portions 152,162 each having a single fastening hole for securing to the underlying frame member 50. As can be seen, this is also an example of mutually complementary flange profiles which do not abut when fixed in position yet present an interleaved pattern nonetheless.

Figure 7:
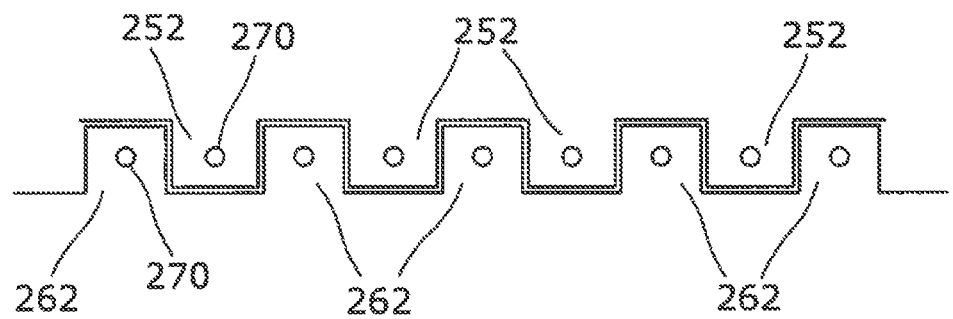

FIG. 7 illustrates another alternative mutually complementary flange profile wherein substantially square flange portions are 252, 262 interleaved with one another wherein each flange portion 252,262 includes a single fixing hole 270.

Figure 8:
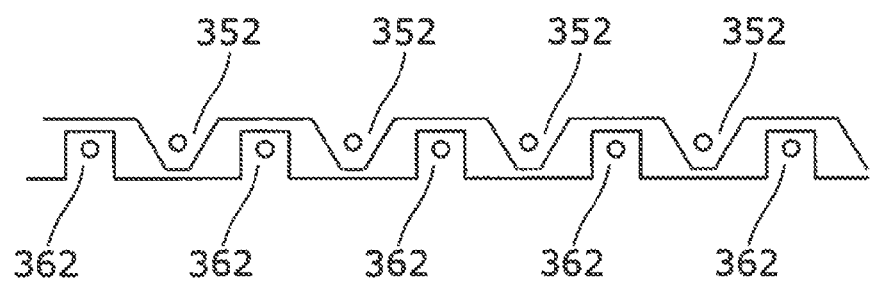

FIG. 8 illustrates yet another alternative example of a mutually complementary flange profile and illustrates that a profile of the right-hand cover plate need not mirror that of the left-hand cover plate. As can been seen one cover plate comprises a set of flange portions 352 each having a trapezium shape whereas the other cover plate includes a repeating pattern of square flange portions 362.

Although described above in relation to a twin-axial processor having rotors that thresh and separate the crop material, it is envisaged that the invention can be applied to a combine having hybrid-type processor wherein the twin separating rotors carry out the separating function downstream of a tangential-flow threshing cylinder.

The above-described embodiments of the invention include flange portions presenting an interleaved, comb-like, shape which permits removal of one cover plate without removing the other. However, it is envisaged that the flanges of the respective cover plates may instead vertically overlap one another without deviating from the scope of the invention. It should be appreciated, however, that in such a construction, it may be necessary to remove one cover plate if access is required to the other.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A combine harvester comprising a frame and a twin rotor crop processor mounted to the frame, the processor comprising a pair of axial-flow crop processing rotors arranged side-by-side and each being mounted for rotation inside a generally cylindrical rotor housing, wherein each rotor housing comprises a curved cover plate, wherein each cover plate has a structure that includes a flange disposed along a longitudinal edge for securing the plate to a central frame member disposed between the rotor housings, and wherein each flange intersects a hypothetical vertical plane aligned with the frame member.

2. The combine harvester according to claim 1, wherein each of said cover plates comprises, along a longitudinal edge, a plurality of flange portions for securing the plates to the central frame member, wherein the plurality of flange portions of each cover plate have a mutually complementary profile to permit removal of either cover plate without removing the other.

3. The combine harvester according to claim 2, wherein the plurality of flange portions of one of said cover plates interleave with the plurality of flange portions of the other said cover plate.

4. The combine harvester according to claim 2, wherein the plurality of flange portions of each cover plate define a complementary repeating profile in the longitudinal direction.

5. The combine harvester according to claim 2, wherein the longitudinal edges of the plurality of flange portions of one cover plate abut the longitudinal edges of the plurality of flange portions of the other cover plate.

6. The combine harvester according to claim 5, wherein the central frame member comprises a single longitudinal row of bolt holes, and wherein the plurality of flange portions of said cover plates are secured to the frame member by bolts inserted into the bolt holes.

7. The combine harvester according to claim 6, wherein each cover plate is bolted to alternate pairs of bolt holes along said row of bolt holes of the central frame member.

* * * * *